US011657272B2

(12) United States Patent
Lee et al.

(10) Patent No.: US 11,657,272 B2
(45) Date of Patent: May 23, 2023

(54) APPARATUS FOR CRASH PERFORMANCE PREDICTION AND METHOD THEREOF

(71) Applicants: Hyundai Motor Company, Seoul (KR); Kia Motors Corporation, Seoul (KR); Soonchunhyang University Industry Academy Cooperation Foundation, Chungcheongnam-do (KR)

(72) Inventors: Shinsun Lee, Gyeonggi-do (KR); Tae Hee Lee, Seoul (KR); Seongkeun Park, Chungcheongnam-do (KR); Hyeonseok Kim, Chungcheongnam-do (KR); Mingyu Park, Chungcheongnam-do (KR)

(73) Assignees: Hyundai Motor Company, Seoul (KR); Kia Motors Corporation, Seoul (KR); Soonchunhyang University Industry Academy Cooperation Foundation, Asan (KR)

( * ) Notice: Subject to any disclaimer, the term of this patent is extended or adjusted under 35 U.S.C. 154(b) by 683 days.

(21) Appl. No.: 16/675,650

(22) Filed: Nov. 6, 2019

(65) Prior Publication Data
US 2021/0019563 A1   Jan. 21, 2021

(30) Foreign Application Priority Data

Jul. 15, 2019   (KR) .......................... 10-2019-0084999

(51) Int. Cl.
*G06T 7/00*        (2017.01)
*G06N 3/08*        (2023.01)
(Continued)

(52) U.S. Cl.
CPC ............. *G06N 3/08* (2013.01); *G06F 18/214* (2023.01); *G06T 7/00* (2013.01); *G06V 10/20* (2022.01);
(Continued)

(58) Field of Classification Search
CPC .. G06N 3/02; G06N 3/08; G06T 2207/20084; G06T 2207/20081; G06K 9/00503; G06K 9/6288; G06K 9/6256; G06V 10/80
See application file for complete search history.

(56) References Cited

U.S. PATENT DOCUMENTS

| 5,729,463 A | 3/1998 | Koenig et al. |
| 2011/0096083 A1* | 4/2011 | Schultz ................ G06T 15/005 703/1 |
| 2020/0394278 A1* | 12/2020 | Varon-Weinryb ...... G06F 17/18 |

FOREIGN PATENT DOCUMENTS

| JP | 2007225353 A | 9/2007 |
| JP | 2008171056 A | 7/2008 |

(Continued)

OTHER PUBLICATIONS

Georgiou et al., "On the assessment of the macro-element methodology for full vehicle crashworthiness analysis", International Journal of Crashworthiness, vol. 23, No. 3, 2018 (Year: 2018).*

(Continued)

*Primary Examiner* — Diane M Wills
(74) *Attorney, Agent, or Firm* — Fox Rothschild LLP

(57) ABSTRACT

An apparatus for crash performance prediction of a vehicle includes: a data processor configured to generate a test target overlap image by pre-processing test target design data; and an output device configured to output at least one of a predicted impact value and a predicted impact rating value for an input of the test target overlap image based on a crash performance prediction model by machine learning the existing overlap image of pre-processed existing design data and the existing impulse data corresponding to the existing design data.

16 Claims, 9 Drawing Sheets

(51) Int. Cl.
*G06V 10/20* (2022.01)
*G06F 18/214* (2023.01)
*G06V 10/764* (2022.01)
*G06V 10/774* (2022.01)
*G06V 10/82* (2022.01)

(52) U.S. Cl.
CPC .......... *G06V 10/764* (2022.01); *G06V 10/774* (2022.01); *G06V 10/82* (2022.01); *G06T 2207/20081* (2013.01); *G06T 2207/20084* (2013.01)

(56) References Cited

FOREIGN PATENT DOCUMENTS

KR 2014-0118157 A 10/2014
KR 101850286 B1 4/2018

OTHER PUBLICATIONS

Shojaeefard, Mohammad Hassan, et al. "Investigation on the optimal simplified model of BIW structure using FEM." Latin American Journal of Solids and Structures 12 (2015): 1972-1990 (Year: 2015).*

* cited by examiner

| RANGE | Point | COLOR |
|---|---|---|
| HIC15 < 650 | 1.00 | |
| 650 ≤ HIC15 < 1000 | 0.75 | |
| 1000 ≤ HIC15 < 1350 | 0.50 | |
| 1350 ≤ HIC15 < 1700 | 0.25 | |
| 1700 ≤ HIC15 | 0.00 | |

APPARATUS FOR CRASH PERFORMANCE PREDICTION AND METHOD THEREOF

CROSS-REFERENCE TO RELATED APPLICATION

This application claims under 35 U.S.C. § 119 the benefit of Korean Patent Application No. 10-2019-0084999, filed on Jul. 15, 2019 in the Korean Intellectual Property Office, the entire contents of which are incorporated by reference herein.

BACKGROUND

1. Technical Field

The disclosure relates to an apparatus and method for crash performance prediction, more particularly, to the apparatus and method for crash performance prediction that provide pedestrian protection based on a machine learning model.

2. Description of the Related Art

In Europe and other countries, a variety of tests are carried out on new vehicles to ensure safety of drivers and pedestrians.

For example, there is a European New Car Assessment Program (NCAP) test, which tests for frontal impacts, side impacts and pedestrian impacts and assigns a rating according to vehicle safety performance.

Therefore, automakers typically design a vehicle to improve safety performance of the vehicle, build a test vehicle and carry out various tests in order to confirm the achievement of a target safety level, and repeat the procedure so that the results are reflected in the vehicle design. In this case, significant cost and time are required, and significant labor is needed as the same test is repeatedly performed. In addition, in the early stage of development or the pilot study stage in which the test vehicle cannot be prepared, the safety performance of the vehicle of the new design information cannot be tested, so the safety performance of the developed vehicle cannot be checked. Therefore, there is a need for a method capable of overcoming the aforementioned disadvantages and obtaining reliable test results for new vehicle designs.

SUMMARY

Therefore, one aspect of the disclosed invention generates a machine learning model for pedestrian safety performance evaluation based on the design information, and provides an apparatus for crash performance prediction and method for crash performance prediction with high reliability and efficiency by using the generated machine learning model.

In accordance with an aspect of the disclosure, an apparatus for crash performance prediction of a vehicle includes: a data processor configured to generate a test target overlap image by pre-processing test target design data, the test target design data including an existing design data of the vehicle, and the data processor further configured to perform pre-processing on an existing impulse data; and an output device configured to output at least one of a predicted impact value and a predicted impact rating value for an input of the test target overlap image based on a crash performance prediction model by machine learning the test target overlap image.

The existing design data includes first design data and second design data, the first design data is a design image of the longitudinal section of the vehicle, the second design data is a design image for the vehicle cross section, wherein the overlap image is generated by overlapping the first design data and the second design data.

The existing design data includes the material information of the vehicle, the material information is reflected in at least one of color, saturation, lightness, solid line and dotted line in the design image.

The overlap image is provided by cropping design images corresponding to each of the first design data and the second design data with the same size based on the impact point and by overlapping the cropped design images.

The overlap image is provided by expanding an image blank except for the design image with respect to at least one of the first design data and the second design data.

The crash performance prediction model includes a weight data updated by machine learning at least one of the overlap image generated by pre-processing the existing design data, and the impact value and the impact rating value generated by pre-processing the existing impulse data.

The existing impulse data includes a color map image, and the impact value and the impact rating value are extracted by parsing the color map image.

The crash performance prediction model includes a first crash performance prediction model generated based on the overlap image and the impact value, and a second crash performance prediction model generated based on the overlap image and the impact rating value.

The output device is configured to output the predicted impact value through the first crash performance prediction model and the predicted impact rating value through the second crash performance prediction model.

The crash performance prediction model is learned by a multi-layer perceptron (MLP) learning model or a convolutional neural network (CNN) learning model, or transfer learned based on the pre-trained model.

In accordance with another aspect of the disclosure, a method for crash performance prediction of a vehicle includes: generating a test target overlap image by pre-processing test target design data, the test target design data including an existing design data of the vehicle, and further performing pre-processing on an existing impulse data corresponding to the existing design data; and outputting at least one of a predicted impact value and a predicted impact rating value for an input of the test target overlap image based on a crash performance prediction model by machine learning the test target overlap image.

The existing design data includes a first design data and a second design data, the first design data is a design image of the longitudinal section of the vehicle, the second design data is a design image for the vehicle cross section, wherein the overlap image is generated by overlapping the first design data and the second design data.

The existing design data includes the material information of the vehicle, the material information is reflected in at least one of color, saturation, lightness, solid line and dotted line in the design image.

The outputting includes: cropping design images corresponding to each of the first design data and the second design data with the same size based on the impact point and overlapping the cropped design images The outputting includes: expanding an image blank except for the design image with respect to at least one of the first design data and the second design data.

The crash performance prediction model includes a weight data updated by machine learning at least one of the overlap image generated by pre-processing the existing design data, and the impact value and the impact rating value generated by pre-processing the existing impulse data.

The existing impulse data includes a color map image, and the impact value and the impact rating value are extracted by parsing the color map image.

The crash performance prediction model includes a first crash performance prediction model generated based on the overlap image and the impact value, and a second crash performance prediction model generated based on the overlap image and the impact rating value.

The outputting includes: outputting the predicted impact value through the first crash performance prediction model and the predicted impact rating value through the second crash performance prediction model.

The crash performance prediction model is learned by a multi-layer perceptron (MLP) learning model or a convolutional neural network (CNN) learning model, or transfer learned based on the pre-trained model.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
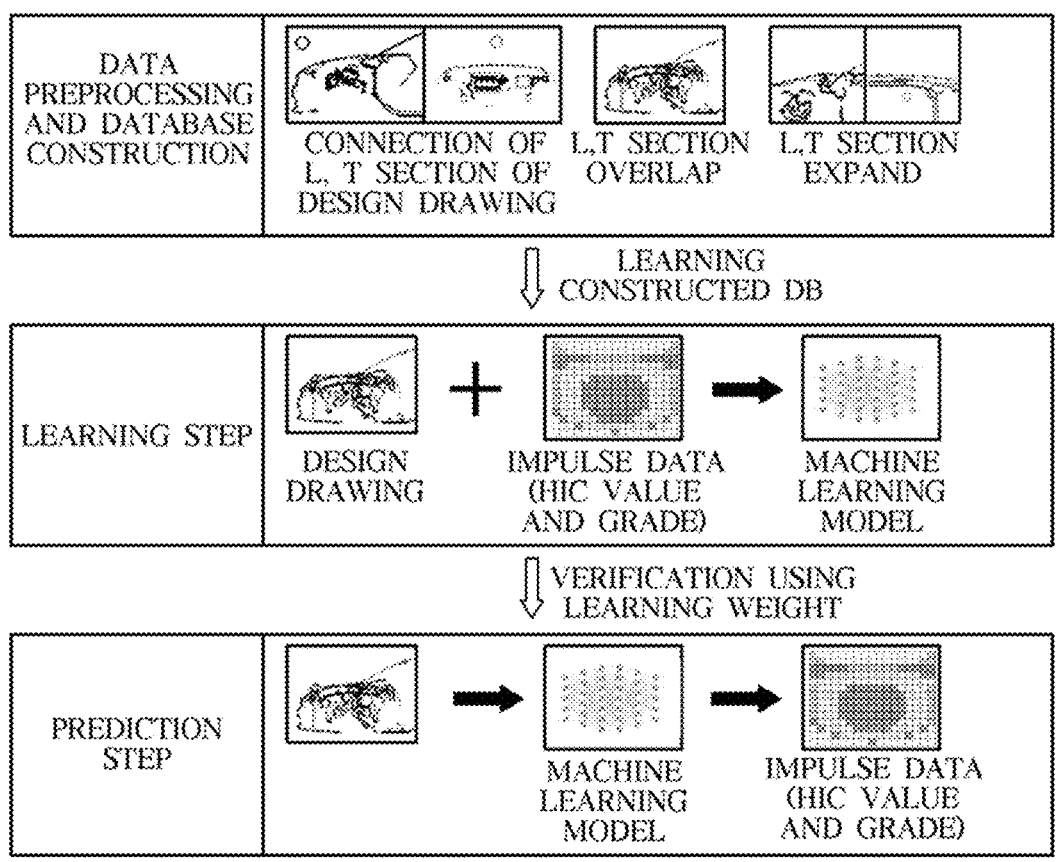
FIG. 1 shows an overview of the overall process applied in the disclosed invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 shows an overview of the overall process applied in the disclosed invention.

The disclosed invention processes a vehicle design drawing in the form of an overlap image, generates a machine learning model based on existing design data and corresponding impulse data, and provides a prediction results of HIC (Head Injury Criterion) values and HIC rating values for the inputted information.

First, the data pre-processing step will be described in detail. The machine learning model is generated by learning existing design data of the pre-processed vehicle and existing impulse data corresponding to the existing design data, as shown in FIG. 1. In this case, the design data may generate an overlap image, and the overlap image refers to data generated according to a result of performing a pre-processing based on design drawings obtained from different aspects such as a cross section and a longitudinal section of the vehicle. A specific pre-processing will be described in detail with reference to FIGS. 4 and 5.

Impulse data may be output as impact values and impact rating values after pre-processing. Here, the impact value is a numerical value of the performance of the impact, the impact rating value corresponds to a value that classifies the rating on the impact. The impact value and the impact rating value may be an HIC value and an HIC rating value.

The learning step applied in the disclosed invention may generate a new machine learning model with updated weights based on the overlap image and the impulse data. In detail, the learning step may generate a machine learning model having optimal parameters by using a loss function and an optimizer (Ex-ADAM) and may update the neural network of the machine learning model by calculating the relation between the overlap image and the impulse data.

Since the neural network described above refers to machine learning that shapes a neural structure capable of performing deep learning, the weight and bias corresponding to the neural network configuration are continuously changed to improve the reliability of learning. That is, the overlap image may be used to continuously update the weights and biases corresponding to the neural network configuration.

In other words, the machine learning applied in the disclosed invention continuously updates the weight, bias, and activation function included in the neural network based on the overlap image and the corresponding impulse data, thereby improving the inference result of the neural network.

In this case, the neural network may be stored in a storage means such as a database (not shown) in the form of a computer program. In the following description, performance of operations performed by a neural network in the form of coding of a computer program will be described. However, the present invention is not necessarily limited to a computer program in which a neural network is stored.

Meanwhile, the neural network may include a convolution neural network (CNN) for generating a feature map output by convolution the overlap image and the corresponding impulse data, and inputting the feature map to the neural network. The neural networks may also be implemented with other deep learning algorithms, including recurrent neural networks (RNN). That is, there is no limit to the type of neural network.

Next, when the machine learning model is generated by the above-described learning process, as a result of inputting design data to be tested into the machine learning model, the HIC prediction value and the HIC rating prediction value may be output.

Figure 2:
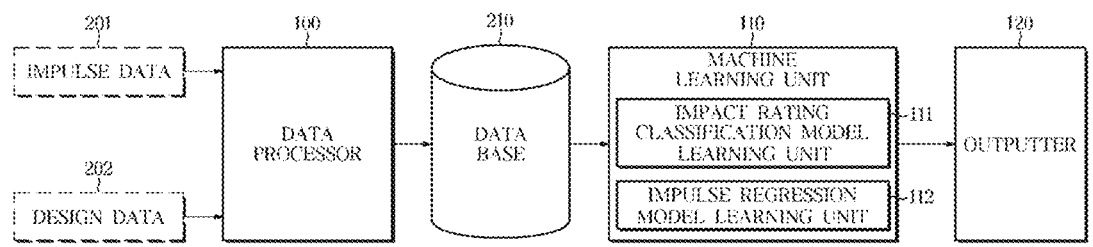
FIG. 2 is a control block diagram of apparatus for crash performance prediction according to an embodiment.

FIG. 2 is a control block diagram of apparatus for crash performance prediction according to an embodiment.

An apparatus for crash performance prediction according to an embodiment includes a data processor 100 performing a pre-processing operation, a machine learning unit 110 applying pre-processed data to machine learning composed of neural networks and an output device ("outputter") 120.

The data processor 100 receives impulse data 201 and design data 202 and performs pre-processing on the received data. The impulse data 201 includes information about the numerical values and/or ratings associated with safety performance assessments through head form impact experiments, and the design data 202 includes information about a design produced in a computer aided design program for designing and developing three-dimensional objects. For example, the design data 202 may be design information produced by CATIA. Design data 202 applied in the disclosed invention may use the granular data to perform an effective pre-processing operation and details will be described in detail with reference to FIGS. 3 to 5.

The database 210 stores input data for the machine learning unit in which the pre-processing is completed in the data processor 100. For example, the database 210 may include high-speed random access memory, magnetic disk, SRAM, DRAM, ROM, and the like. The database 210 means various memory devices which can function as a storage (not shown).

The machine learning unit 110 includes an impact rating classification model learning unit 111 and an impulse regression model learning unit 112.

The impact rating classification model learning unit 111 may update the weight corresponding to the neural network configuration by learning based on the overlap image generated as a result of pre-processing the design data 202 and the corresponding HIC rating value.

The impulse regression model learning unit 112 may update the weight corresponding to the neural network configuration by learning based on the overlap image generated as a result of pre-processing the design data 202 and the corresponding HIC value.

The output device 120 may output the HIC prediction value and the HIC rating prediction value with respect to the input of the test target data based on the machine learning model generated by the machine learning unit 110. Specifically, the output device 120 may output the prediction result value when the user inputs the test target data of the vehicle to be evaluated for the pedestrian impulse test to the machine learning unit 110.

Figure 3:
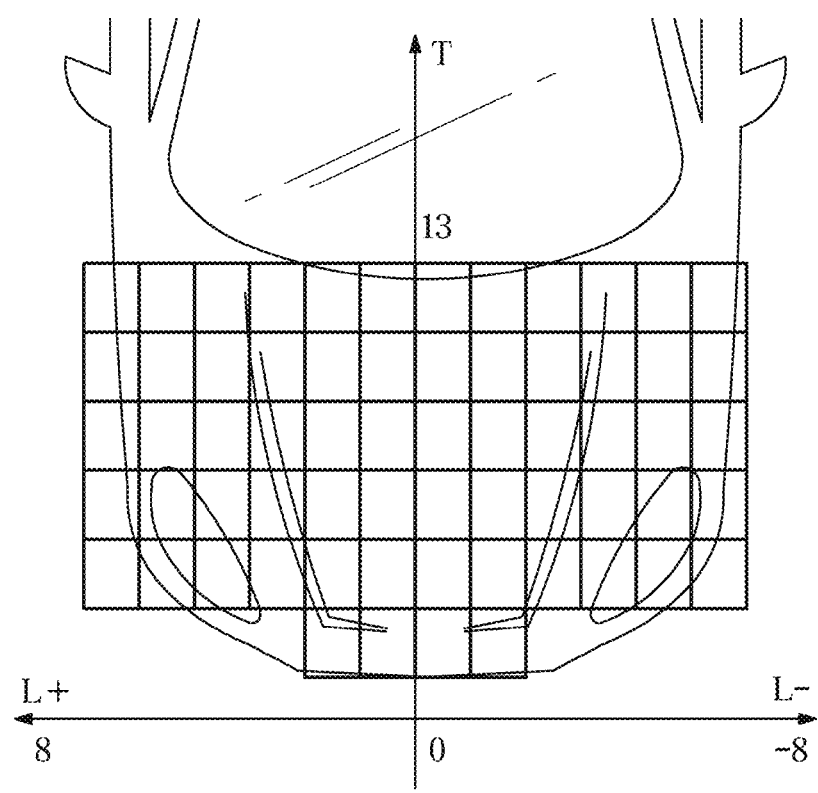
FIGS. 3 and 4A to 4B are diagrams for describing design data.
Figure 4A:
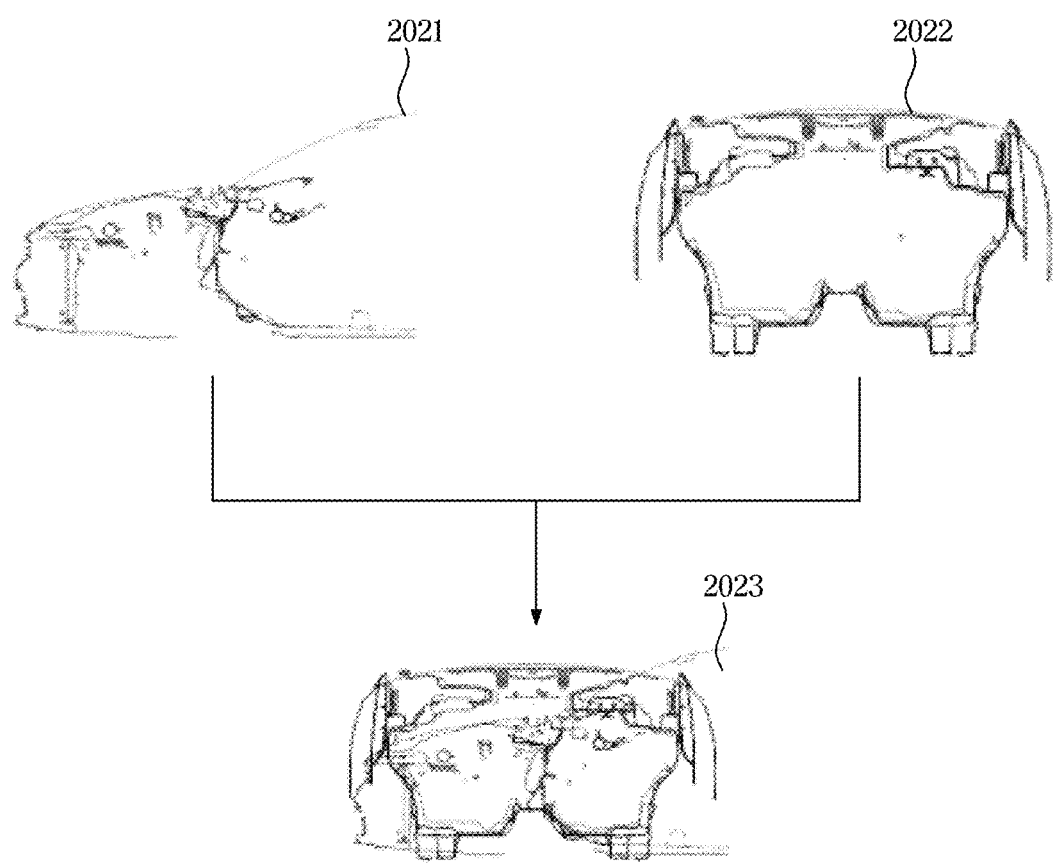
Figure 4B:
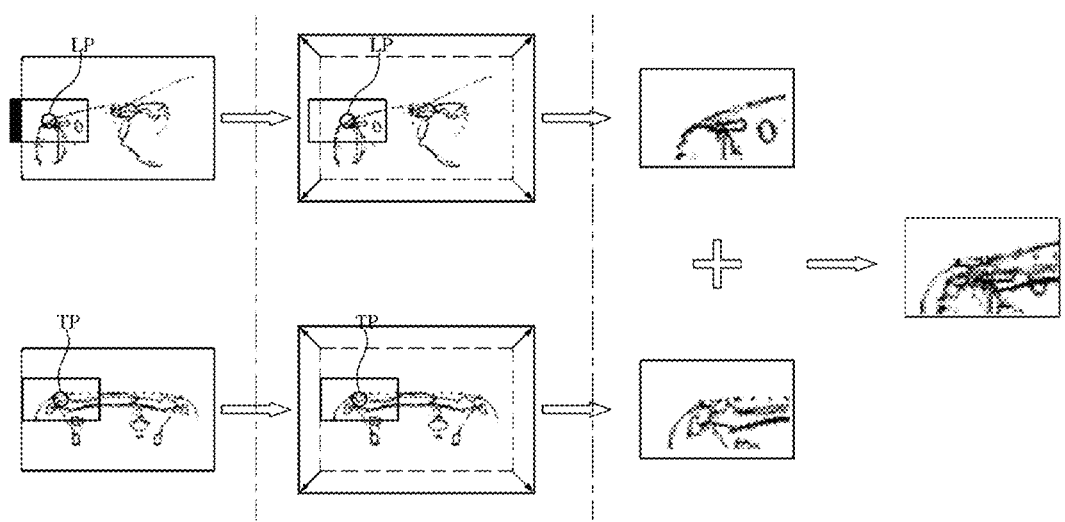

FIGS. 3 and 4A-4B are diagrams for describing design data. Hereinafter, design data and an overlap image derived from the design data applied to the disclosed invention will be described in detail with reference to FIG. 3 and FIGS. 4A to 4B.

First, the image output based on the design data may be divided into a longitudinal section and a cross section or an L section and a T section based on the design section of the hood and the engine room of the vehicle front part. Referring to FIG. 4A, the first design data 2021 based on the L section may be information reflecting an impact point on an outline forming an image viewed from the side of the vehicle. The second design data 2022 based on the T section may be information reflecting an impact point on an outline forming an image viewed from the front of the vehicle.

In addition, the design data may include material information of the vehicle. For example, the image output based on the design data may be divided into various colors. Here, the color may reflect material information of the vehicle. For example, the glass material may be green, the metal material may be blue, and the plastic material may be red. The vehicle is made of various materials, and the resistance to impact varies depending on the material. In order to reflect this information, the design data may include color information reflecting material information of the vehicle. In addition to being expressed in color, the material information may be expressed by allowing the materials of the vehicle to be distinguished from each other by using different characteristics: saturation and, brightness, solid line and dotted line, etc.

Next, the first design data 2021 and the second design data 2022 may overlap each other to generate an overlap image 2023. The overlap image 2023 is shown below in FIG. 4A.

Meanwhile, the overlap image 2023 may be an image in which different images of the first design data 2021 and the second design data 2022 are enlarged and overlapped. Here, an image blank may be added to a part of the image in order to prevent loss of the output image. In other words, by adding an image blank, the image blank of design image does not occur when the design images corresponding to each of the first design data and the second design data share the same impact point, and each image is cropped to the same size and generated as an overlapped image.

Referring to FIG. 4B, the first partial image may be extracted based on the impact point LP included in the first design data. Here, the first partial image may be overlapped with the second partial image extracted based on the impact point TP included in the second design data. Meanwhile, since the impact point LP is based on the left end of the first partial image, when the first partial image is cropped to the same image size, image loss may occur on the left side. Therefore, the image blank area of the entire image of the first design data may be enlarged. Accordingly, the first partial image may be overlapped with the second partial image with the same image size without losing any portion.

According to an embodiment, when it is determined that a part of the partial image set based on the impact point is out of the entire image of the design data, the data processor 100 may expand the blank area of the entire image.

Such an overlap process is a process for defining a single image of the same size as input data in order to perform highly reliable machine learning. The overlapped image contains various information such as impact point, location, structure, material, etc. for at least two vehicle sections. The above-described overlap process may be performed for various vehicle types and stored in the database.

The design data referred to in one embodiment may include first design data and second design data, the first design data is a design image of the longitudinal section of the vehicle, the second design data is a design image for the vehicle cross section, the overlap image is generated by overlapping the first design data and the second design data.

Figure 5:
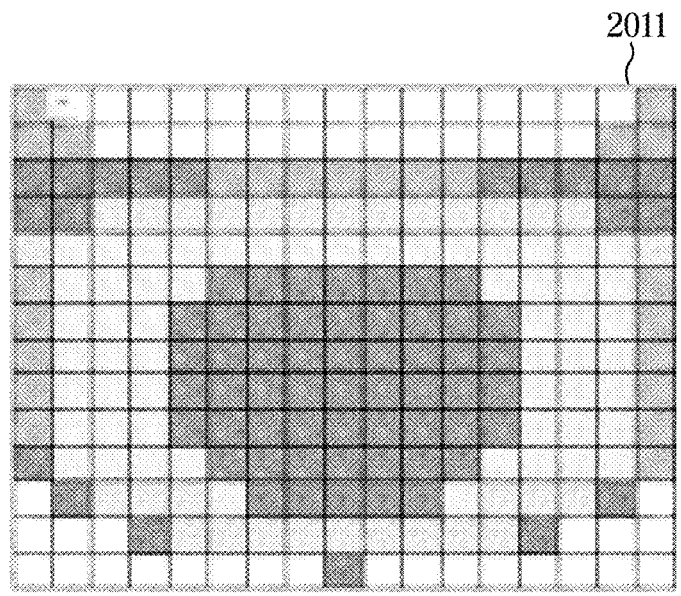
FIG. 5 is a diagram for describing impulse data.

FIG. 5 is a diagram for describing impulse data.

As illustrated in FIG. 5, the HIC color map image 2011 output from impulse data may provide HIC rating as visual information based on various colors.

Head Injury Criterion (HIC) refers to an index indicating a human injury occurring in a collision accident between a vehicle and a pedestrian. The HIC color map image 2011 may extract an HIC value and an HIC rating value based on data included therein. The extraction process may be performed through parsing the HIC color map image 2011. Here, the HIC value and the HIC rating value may be determined based on the Euro NCAP test. For example, it may be represented by a table shown below in FIG. 5. Through this parsing process, HIC value and HIC rating value may be constructed as regression model DB and classification model DB, respectively.

Figure 6:
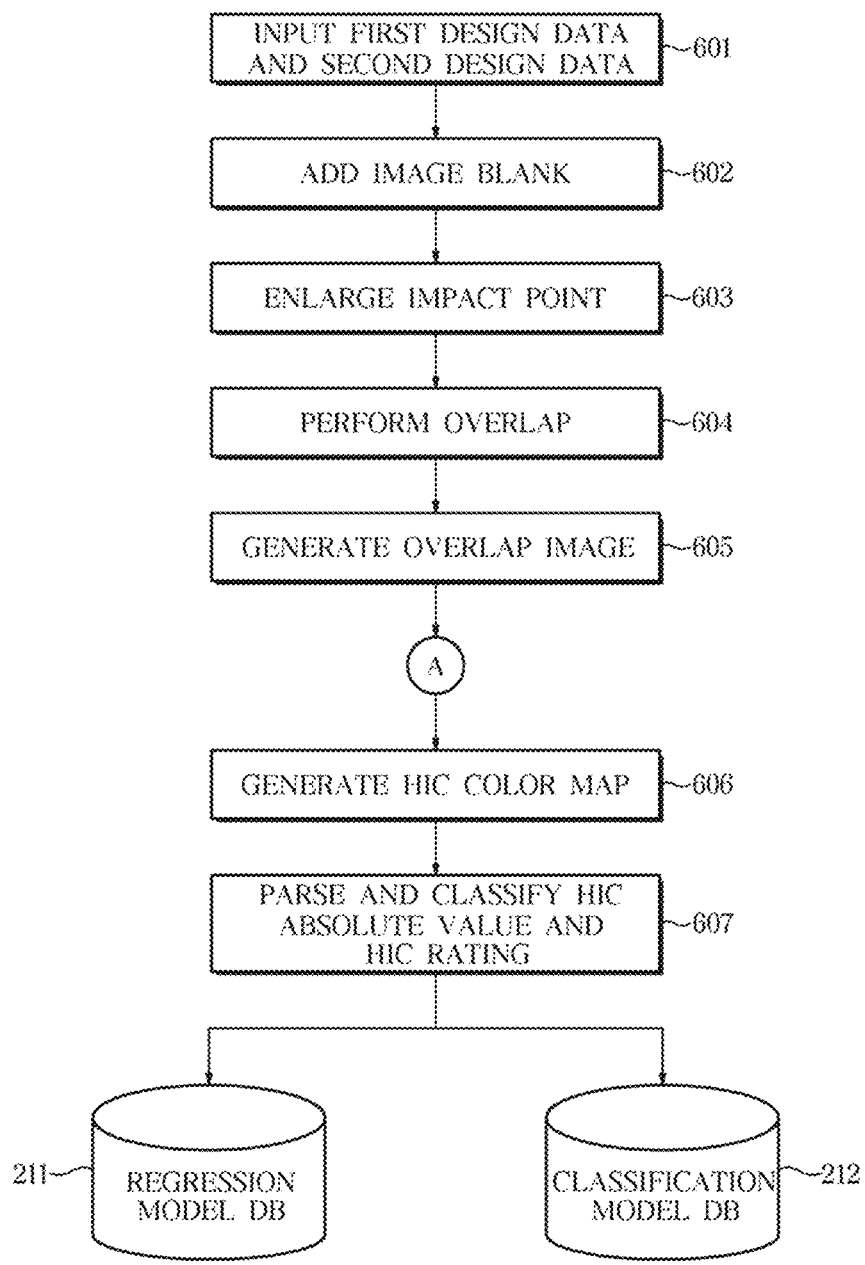
FIG. 6 is a flowchart illustrating a pre-processing process applied in the disclosed invention.

FIG. 6 is a flowchart illustrating a pre-processing process applied in the disclosed invention. However, this is only a preferred embodiment for achieving the object of the present invention, of course, some steps may be added or deleted as necessary. In addition, as shown in FIG. 6, the process of generating the overlap image and the process of generating the regression model DB and the classification model DB may be performed separately or simultaneously.

The data processor 100 receives an input for first design data and second design data by a user (601). Here, the first design data and the second design data to be input are as described above.

When the input of the first design data and the second design data is completed, the data processor 100 adds an image blank (602) and enlarges an impact point included in the image before performing overlap on a part of the image for each. (603).

The data processor 100 performs an overlap with a part of an image of the first design data and a part of the image of the second design data (604), generates an overlap image (605), and stores the overlap image into the database 210. In this case, the stored data may include various types of overlap images including various vehicles.

The data processor 100 performs a pre-processing process on impulse data separately from a pre-processing process on the design data. The impulse data may be provided in a HIC color map.

The data processor 100 performs parsing on the HIC color map of the vehicle corresponding to the design data input as the impulse data, extracts and classifies HIC values and HIC rating values (607), and databases each of them into a regression model DB 211 and a classification model DB 212. Here, the generated and stored regression model DB 211 and the classification model DB 212 may update the weight data through a learning process of generating a machine learning model. The learning process of generating the machine learning model will be described in detail with reference to FIG. 7.

Figure 7:
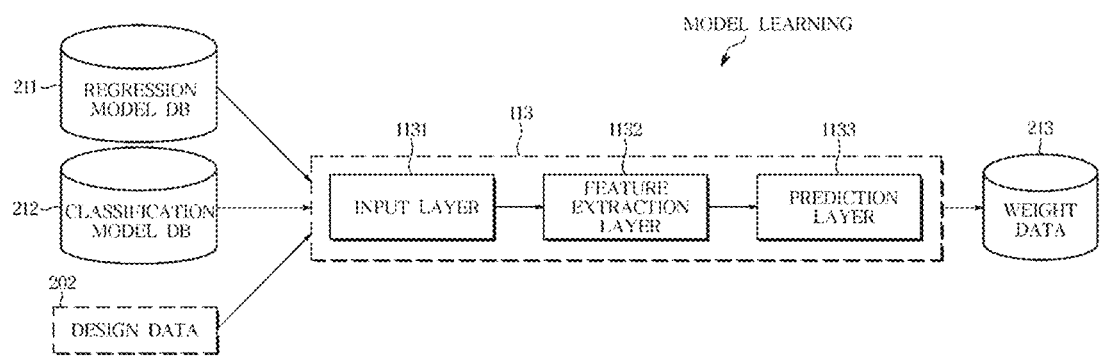
FIG. 7 illustrates a learning process of a crash performance prediction model according to an embodiment.

FIG. 7 illustrates a learning process of a crash performance prediction model according to an embodiment.

The machine learning model referred to in the disclosed invention may be classified into two types of an impulse regression model and a rating classification model. Specifically, the impulse regression model is generated according to the learning result on the HIC value, and the rating classification model is generated according to the learning result on the HIC rating value.

The learning process for generating the impulse regression model may be performed by the regression model DB 211 and the design data 202. Although FIG. 7 illustrates that the design data 202 is input as input data, the input data may be an overlap image in which pre-processing is performed on the design data 202. The regression model DB 211 may include impulse data corresponding to the design data 202. Here, the impulse data may be an HIC value. In other words, the regression model DB 211 may be an answer for deriving machine learning results for the design data 202 or the overlap image.

For example, the overlap image is transferred to the feature extraction layer 1132 via the input layer 1131. The feature extraction layer 1132 extracts a feature in the image by analyzing the transferred overlap image and transmits the feature in the prediction layer 1133. The prediction layer 1133 generates a result and updates a weight corresponding to the neural network configuration based on the regression model DB 211 which is output data. The updated weight is generated as weight data 213, which is then applied to a machine learning model for performing the actual crash performance test, and when the test target data of the actual target vehicle is inputted, a high performance HIC prediction value may be derived.

The learning process for generating the impulse rating classification model may be performed by the classification model DB 212 and the design data 202. Although FIG. 7 illustrates that the design data 202 is input as input data, the input data may be an overlap image in which pre-processing is performed on the design data 202. The classification model DB 212 may include impulse data corresponding to the design data 202. Here, the impulse data may be an HIC rating value. In other words, the classification model DB 212 may be an answer for deriving machine learning results for the design data 202 or the overlap image.

For example, the overlap image is transferred to the feature extraction layer 1132 via the input layer 1131. The feature extraction layer 1132 extracts a feature in the image by analyzing the transferred overlap image and transmits the feature in the prediction layer 1133. The prediction layer 1133 generates a result and updates a weight corresponding to the neural network configuration based on the classification model DB 212 which is output data. In this case, the result generated by the prediction layer 1133 may include data about the probability of being located in the prediction rating based on five ratings as a whole rating. The updated weight is generated as weight data 213, which is then applied to a machine learning model for performing the actual crash performance test, and when the test target data of the actual target vehicle is inputted, a high performance HIC rating prediction value may be derived.

The crash performance prediction model may be classified into a first performance prediction model generated based on the overlap image and the impact value, and a second performance prediction model generated based on the overlap image and the impact rating value. The crash performance prediction model may be implemented as a model that outputs both an impact value and an impact rating value at the same time, and outputs both a predicted impact value and a predicted impact rating value.

Figure 8:
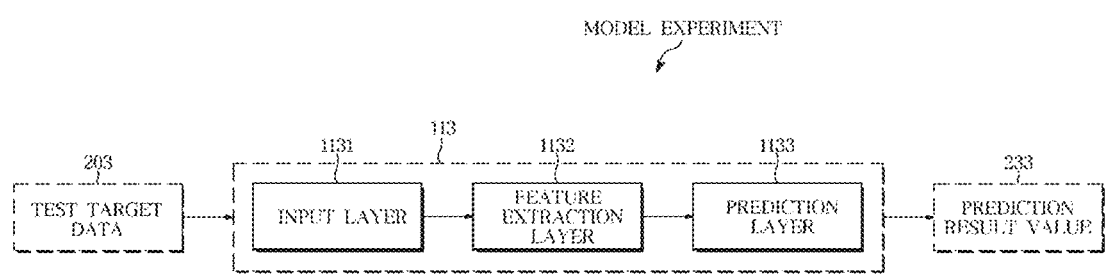
FIG. 8 illustrates a process of deriving an impact test result by the crash performance prediction model according to an embodiment.

FIG. 8 illustrates a process of deriving an impact test result by the crash performance prediction model according to an embodiment.

Referring to FIG. 8, the machine learning model 113 corresponds to a model to which weights updated by the above-described learning process are applied. The machine learning model 113 optimizes the weights for the detailed layers based on the design data of various vehicles.

The test target data 203 indicates design data of a vehicle to be a test target, and may be input in an image of any one side or in the overlap image format described above. The prediction result value 233 represents the result of the input of the test target data 203. The prediction result value 233 may be output as an image in the form of a color map, and may include information about the actual HIC absolute value, the prediction HIC absolute value, the actual HIC rating value, the prediction HIC rating value, and the probability of predicting the corresponding rating.

The apparatus for crash performance prediction according to an embodiment may include a data processor for receiving the design data and the impulse data, generating an overlap image by performing a pre-processing operation on the design data, and extracting at least one of HIC absolute value and HIC rating by performing a pre-processing operation on the impulse data. The apparatus for crash performance prediction according to an embodiment provides a result of performing a pre-processing operation by a data processor to a machine learning unit. The machine learning unit determines at least one of an overlap image, HIC absolute value, and an HIC rating as inputs and outputs for machine learning, and generates a crash performance prediction model including updated weight data based on the inputs and outputs. The output device outputs at least one of the HIC regression prediction value and the HIC rating prediction value of the test target data based on the crash performance prediction model.

The crash performance prediction model employed by the apparatus for crash performance prediction may perform transfer learning based on a pre-trained model such as a ResNet, DenseNet, or Inception model among a multi-layer perceptron (MLP) or a convolutional neural network (CNN). However, in addition to the above-described network, the crash performance prediction model may employ various techniques for updating the weight of the neural network.

The disclosed invention is applicable not only to the pedestrian impact test evaluation, but also to various tests for verifying stability through analysis on the design.

According to one aspect of the disclosed invention, it is possible to obtain a crash performance prediction result with high reliability for the design data without the existing impulse data, without performing an impact test of the actual vehicle.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An apparatus for crash performance prediction of a vehicle, comprising:
   a data processor configured to generate a test target overlap image by pre-processing test target design data; and
   an output device configured to output at least one of a predicted impact value and a predicted impact rating value for an input of the test target overlap image based on a crash performance prediction model by machine learning the existing overlap image of pre-processed existing design data and the existing impulse data corresponding to the existing design data;
   wherein the existing design data comprises first design data and second design data, the first design data is a design image of a longitudinal section of the vehicle, the second design data is a design image for a cross section of the vehicle;
   wherein the test target overlap image is generated by overlapping the first design data and the second design data; and
   wherein the test target overlap image is provided by cropping the design images corresponding to each of the first design data and the second design data of a same size based on an impact point and by overlapping the cropped design images.

2. The apparatus according to the claim 1, wherein the existing design data comprises material information of the vehicle, and the material information is reflected in at least one of color, saturation, brightness, solid line and dotted line in the design images.

3. The apparatus according to the claim 1, wherein the test target overlap image is provided by expanding an image blank except for the design image with respect to at least one of the first design data and the second design data.

4. The apparatus according to the claim 1, wherein the crash performance prediction model comprises a weight data updated by machine learning at least one of the test target overlap image generated by pre-processing the existing design data, and the impact value and the impact rating value generated by pre-processing the existing impulse data.

5. The apparatus according to the claim 4, wherein the existing impulse data comprises a color map image, and the impact value and the impact rating value are extracted by parsing the color map image.

6. The apparatus according to the claim 4, wherein the crash performance prediction model comprises a first crash performance prediction model generated based on the overlap image and the impact value, and a second crash performance prediction model generated based on the overlap image and the impact rating value.

7. The apparatus according to the claim 6, wherein the output device is configured to output the predicted impact value through the first crash performance prediction model and the predicted impact rating value through the second crash performance prediction model.

8. The apparatus according to the claim 1, wherein the crash performance prediction model is learned by a multi-layer perceptron (MLP) learning model or a convolutional neural network (CNN) learning model, or transfer learned based on a pre-trained model.

9. A method for crash performance prediction of a vehicle, comprising:
  generating a test target overlap image by pre-processing test target design data; and
  outputting at least one of a predicted impact value and a predicted impact rating value for an input of the test target overlap image based on a crash performance prediction model by machine learning the existing overlap image of pre-processed existing design data and the existing impulse data corresponding to the existing design data;
  wherein the existing design data comprises a first design data and a second design data, the first design data is a design image of the longitudinal section of the vehicle, the second design data is a design image for a cross section of the vehicle;
  wherein the test target overlap image is generated by overlapping the first design data and the second design data; and
  wherein the outputting comprises cropping the design images corresponding to each of the first design data and the second design data with a same size based on the impact point and overlapping the cropped design images.

10. The method according to the claim 9, wherein the existing design data comprises material information of the vehicle, and the material information is reflected in at least one of color, saturation, lightness, solid line and dotted line in the design images.

11. The method according to the claim 9, wherein the outputting comprises:
  expanding an image blank except for the design image with respect to at least one of the first design data and the second design data.

12. The method according to the claim 9, wherein the crash performance prediction model comprises a weight data updated by machine learning at least one of the test target overlap image generated by pre-processing the existing design data, and the impact value and the impact rating value generated by pre-processing the existing impulse data.

13. The method according to the claim 12, wherein the existing impulse data comprises a color map image, and the impact value and the impact rating value are extracted by parsing the color map image.

14. The method according to the claim 12, wherein the crash performance prediction model comprises a first crash performance prediction model generated based on the test target overlap image and the impact value, and a second crash performance prediction model generated based on the test target overlap image and the impact rating value.

15. The method according to the claim 14, wherein the outputting comprises: outputting the predicted impact value through the first crash performance prediction model and the predicted impact rating value through the second crash performance prediction model.

16. The method according to the claim 9, wherein the crash performance prediction model is learned by a multi-layer perceptron (MLP) learning model or a convolutional neural network (CNN) learning model, or transfer learned based on a pre-trained model.

* * * * *